United States Patent [19]

Setani

[11] Patent Number: 4,755,013
[45] Date of Patent: Jul. 5, 1988

[54] LIGHT SCANNING OPTICAL SYSTEM OF AN IMAGE OUTPUT SCANNER USING AN ELECTRO MECHANICAL LIGHT MODULATOR

[75] Inventor: Michitaka Setani, Kawasaki, Japan

[73] Assignee: Canon Kabushiki Kaisha, Tokyo, Japan

[21] Appl. No.: 115,564

[22] Filed: Oct. 29, 1987

Related U.S. Application Data

[63] Continuation of Ser. No. 820,750, Jan. 22, 1986, abandoned.

[30] Foreign Application Priority Data

Jan. 23, 1985 [JP] Japan ................... 60-009158

[51] Int. Cl.$^4$ ............................................. G02B 26/10
[52] U.S. Cl. ...................................... 350/6.6; 350/360; 358/233; 358/293
[58] Field of Search ................. 350/6.6, 6.8, 6.9, 6.91, 350/360; 358/233, 293

[56] References Cited

U.S. PATENT DOCUMENTS

| | | |
|---|---|---|
| 3,746,911 | 7/1973 | Nathanson et al. ................. 358/233 |
| 3,886,310 | 5/1975 | Guldberg et al. ................... 350/360 |
| 4,199,219 | 4/1980 | Suzki et al. ......................... 350/6.8 |
| 4,454,547 | 6/1984 | Yip et al. ............................. 358/293 |
| 4,512,625 | 4/1985 | Brueggemann ..................... 350/6.8 |
| 4,523,801 | 6/1985 | Baba et al. .......................... 350/6.8 |

Primary Examiner—John K. Corbin
Assistant Examiner—Loha Ben
Attorney, Agent, or Firm—Fitzpatrick, Cella, Harper & Scinto

[57] ABSTRACT

A light scanning optical system of an image output scanner comprises an irradiating optical system, an electro-mechanical light modulator comprising a number of elements on which a light beam is incident from a light source through the irradiating optical system and which are capable of deflecting the light beam in at least two directions in accordance with an input signal, the elements being arranged in the main scan direction, the elements making image information by the change-over of the direction of deflection, and a projection optical system for projecting only the signal light of the image information, the image of the light source being set so as to be formed on the entrance pupil of the projection optical system at a magnification in the vicinity of one-to-one magnification.

22 Claims, 4 Drawing Sheets

LIGHT SCANNING OPTICAL SYSTEM OF AN IMAGE OUTPUT SCANNER USING AN ELECTRO MECHANICAL LIGHT MODULATOR

This application is a continuation of application Ser. No. 820,750 filed Jan. 22, 1986, now abandoned.

BACKGROUND AND SUMMARY OF THE INVENTION

This invention relates to a light scanning optical system of an image output scanner using an electromechanical light modulator.

An image output scanner is a device used in a copying apparatus, a facsimile apparatus or the like to scan the image of an original such as a document and put out the image as image information by a light or an electrical signal. Various forms of such image output scanner are known.

For example, many of the image output scanners used in popular PPC copying apparatuses are of the type in which an original is scanned by the light of a halogen lamp or the like and the reflected light therefrom is directly imaged on an electrophotographic photosensitive medium. Besides these, there is a method whereby, as in a laser beam printer, the image of an original is converted into an electrical signal, whereafter on the basis of this signal, a laser beam is modulated by the use of a light modulator and is imaged on a photosensitive medium.

Also, in recent years, along with the development of the integrated circuit technique, there has been proposed an image output scanner using an electromechanical light modulator having a number of minute deflecting elements on a base.

The general construction of such image output scanner will hereinafter be described with reference to the accompanying drawings.

FIG. 1 schematically shows an example of the image output scanner using the above-described electromechanical light modulator (hereinafter simply referred to as the light modulator). In FIG. 1, reference numeral 1 designates a light source such as a tungsten lamp, reference numeral 2 denotes an irradiating optical system, reference numeral 3 designates a light modulator, reference numeral 4 denotes a projection optical system, reference numeral 5 designates a reflecting mirror, and reference numeral 6 denotes a photosensitive drum.

The light from the lamp 1 is applied onto the light modulator 3 by the irradiating optical system 2, and only the necessary image signal reflected light is condensed on the photosensitive drum 6 by the projection optical system 4 via the reflecting mirror 5. At present, in such an image output scanner, various shapes of the light modulator 3 are conceived.

FIG. 2A is an enlarged schematic perspective view showing an example of such light modulator 3, and FIG. 2B is an enlarged schematic side view thereof.

In FIG. 2, reference character 3a designates mirror picture element plates adapted to be bent up and down by electromechanical means. As shown in FIG. 2B, the direction of the reflected light 7 from the downwardly bent mirror picture element plate 3a (indicated by dotted lines) differs from the direction of the reflected light from the unbent mirror picture element plate 3a (indicated by solid lines). By the directions of the plurality of mirror picture element plates 3a being thus discretely changed in accordance with an image signal input to the light modulator 3, an electrostatic latent image corresponding to the image signal can be formed on the surface of the photosensitive drum 6. The electrostatic latent image is converted into a visible image by the well-known electrophotographic process.

However, in the image output scanner as described above, the direction of bending of the mirror picture element plate 3a does not twist but is downwardly inclined with respect to the side of the mirror picture element plate 3a as shown in FIG. 2B and therefore, separation of the signal light and the unnecessary reflected light 7 becomes difficult when the diffraction in the image space is considered. As a result, the distance between the light modulator 3 and the projection optical system 4 must be made long until two diffracted lights can be separated from each other. This is nothing but to make the optical system large in the lateral direction thereof. Also, even if the two diffracted lights could be separated from each other at a short distance, making the optical system compact would encounter a problem that an optical contrivance for shortening the focal length of the projection optical system is required.

It is an object of the present invention to provide a compact light scanning optical system of an image output scanner using an electro-mechanical light modulator.

It is a further object of the present invention to provide a light scanning optical system for uniformly illuminating the element array of said modulator.

It is still a further object of the present invention to provide a compact light scanning optical system which can efficiently separate unnecessary diffracted light and image signal light from each other.

It is yet still a further object of the present invention to provide a light scanning optical system which is excellent in quality of printing and compact.

According to the present invention, in order to solve the above-noted problems, there is provided a light scanning optical system of an image output scanner in which a light beam incident from a light source through an irradiating optical system is applied to an electromechanical light modulator comprising a number of elements capable of deflecting the light beam in at least two directions in accordance with an input signal and arranged in the main scan direction (the direction perpendicular to the plane of the drawing sheet of FIG. 1) and image information is made by the changeover of the direction of deflection of each element, whereafter only a necessary deflected light is projected onto a photosensitive member by a projection optical system, characterized in that the image of the light source is set so as to be formed on the entrance pupil of the projection optical system at a magnification in the vicinity of one-to-one magnification.

DESCRIPTION OF THE PREFERRED EMBODIMENT

A specific embodiment of the present invention will hereinafter be described with reference to the drawings.

Figure 3A:
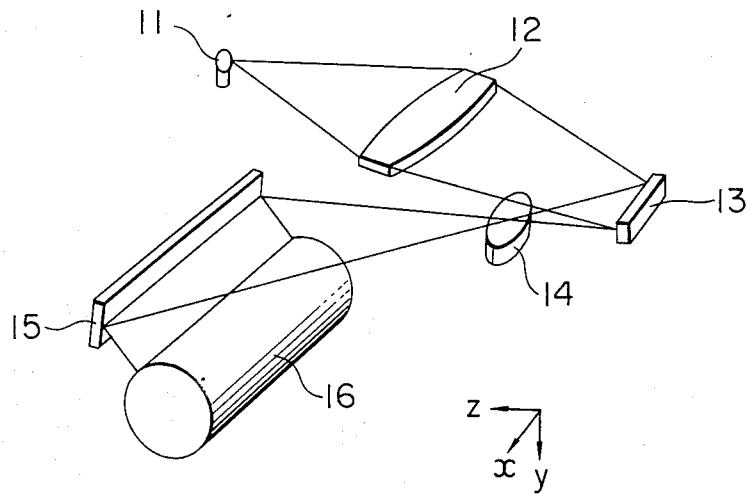
FIG. 3A is a schematic perspective view of the optical system of the present invention.
Figure 3B:
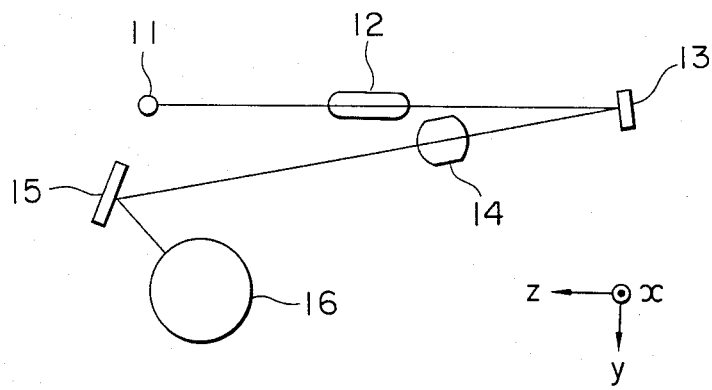
FIGS. 3B and 5 are cross-sectional views of the optical system of the present invention.

FIG. 3A is a schematic perspective view showing an embodiment of the light scanning optical system of the present invention, and FIG. 3B is a cross-sectional view thereof.

In FIGS. 3A and 3B, reference numeral 11 designates a lamp as a light source, reference numeral 12 denotes an irradiating optical system (including the reflection type also and shown as a condenser lens), and reference numeral 13 designates an electro-mechanical light modulator. A light beam emitted from the lamp 11 is applied onto the electro-mechanical light modulator 13 by the condenser lens 12 and is modulated thereby, and thereafter is reflected. The reflected light is magnification-changed by a projection optical system 14 (including the reflection type also and shown as a projection lens) in conformity with a desired printing width and resolution, whereafter it is projected onto a photosensitive drum 16 via a reflecting mirror 15.

The lamp 11 need not be a laser of great intensity, but may sufficiently be an inexpensive lamp such as a conventional tungsten halogen lamp used in a moving picture projector or the like, because in the main scan direction, imaging is effected on the photosensitive drum 16 substantially at the same time and therefore a long exposure time can be secured.

Figure 4A:
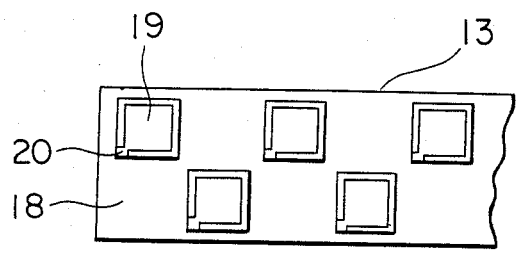
FIG. 4A is an enlarged front view of an electromechanical light modulator according to the present invention.

FIG. 4A is an enlarged front view of the electro-mechanical light modulator 13 (hereinafter simply referred to as the light modulator). Reference numeral 18 designates a flat base portion, and reference numeral 19 denotes mirror picture element plates the inclination of whose surface can be changed. In the case of FIG. 4A, a number of such mirror picture element plates are arranged in two rows.

The light modulator 13 is manufactured by a process similar to the process of manufacturing IC or LSI, and has a construction similar to that of an MOS type FET transistor. The dimension of each side of each mirror picture element plate 19 is minute, say, of the order of 5–15 μm. Such picture element plates are described in detail in U.S. application Ser. No. 748,835 assigned to the assignee of the present application.

Figure 1:
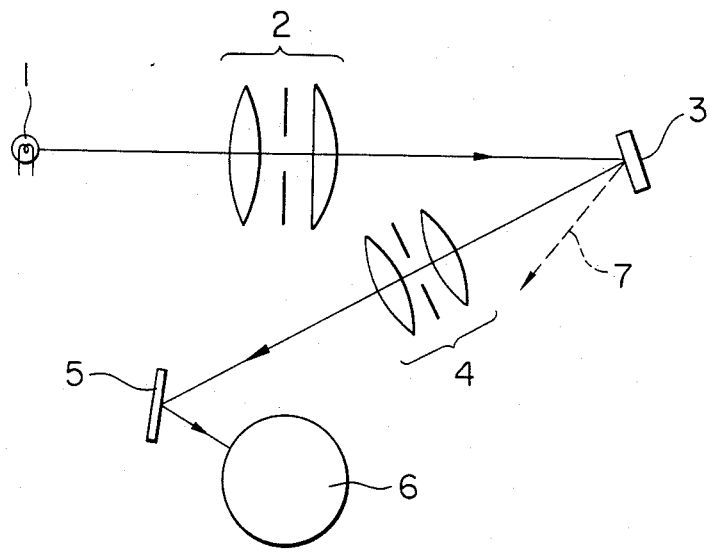
FIG. 1 schematically shows an example of the image output scanner using an electro-mechanical light modulator according to the prior art.
Figure 2A:
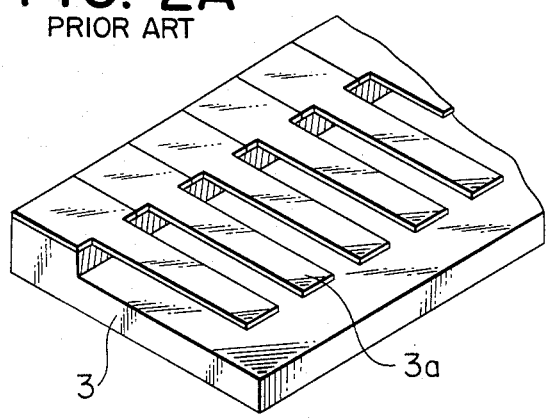
FIGS. 2A and 2B illustrate the light modulator of the prior art in FIG. 1.
Figure 2B:
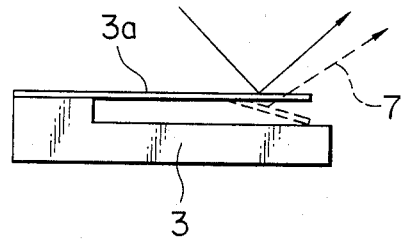
Figure 4B:
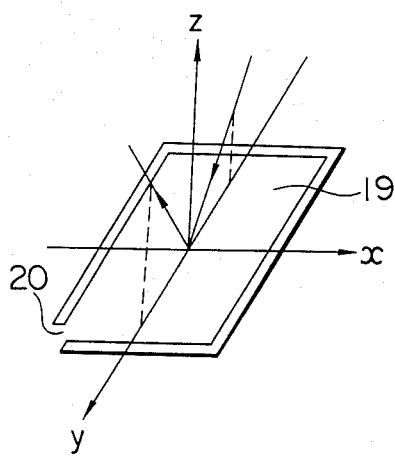
FIGS. 4B and 4C show the movement of a picture element on the light modulator of FIG. 4A.
Figure 4C:
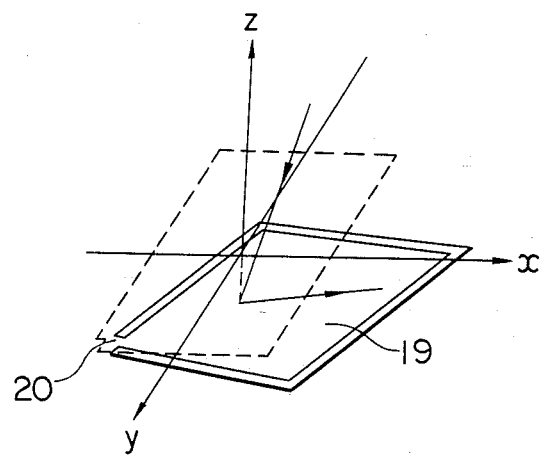
Figure 5:
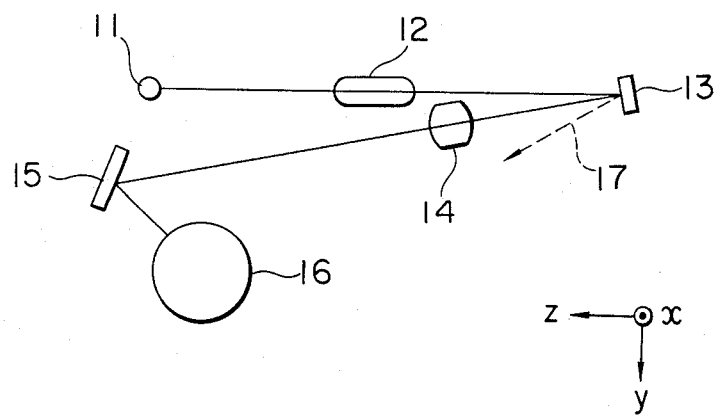

Each of the above-described mirror picture element plates 19 keeps its parallelism to the base in the signal OFF state as shown in FIG. 4B in accordance with an input binary modulation signal, and falls downwardly with a hinge portion 20 as the axis of rotation in the signal ON state as shown in FIG. 4C. This falling-down takes place about the hinge portion 20 at a corner of the quadrilateral of the mirror picture element plate 19 and thus, unlike the bending of the surface of the mirror picture element plate 3a as shown in FIG. 2A, the surface of the mirror picture element plate 19 after it has fallen down is obliquely inclined with respect to the surface thereof before it falls down. The light having entered the light modulator 13 is reflected and deflected in conformity with the angle of fall-down. This state is shown in FIG. 5, wherein the reflected light 17 indicated by dotted line is that in the signal OFF state. Of these two directions of reflection, the reflected light beam in the signal ON state is directed onto the photosensitive drum 16 by the projection lens 14, whereby there is obtained a row of dots corresponding to each picture element input modulation signal. Each dot is formed correspondingly to the ON and OFF of each picture element and therefore is high in information processing function.

Figure 6:
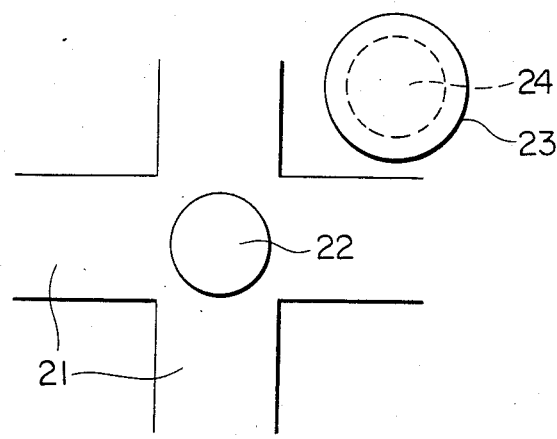
FIG. 6 shows the distribution of light on a plane containing the entrance pupil of a projection lens.

FIG. 6 schematically shows the distribution of the reflected light on a plane containing the entrance pupil of the projection lens 14 spaced apart from the light modulator 13 by a finite distance in the direction of reflection.

In FIG. 6, reference numeral 21 designates the distribution of the reflected light 17 in the signal OFF state, i.e., the diffraction pattern of unnecessary light, and reference numeral 22 denotes the image of the filament of the light source. Reference numeral 23 designates the entrance pupil of the projection lens 14, and reference numeral 24 denotes the distribution of the reflected light in the signal ON state, i.e., the necessary light modulation signal.

Figures 7A, 7B:
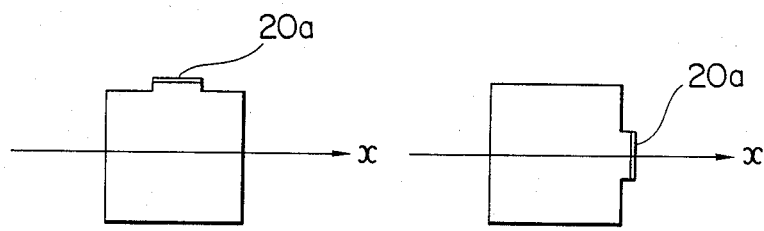
FIGS. 7A, 7B, 7C and 7D illustrate various cases where the position at which a hinge portion is attached to a mirror picture element plate is changed.
Figures 7C, 7D:
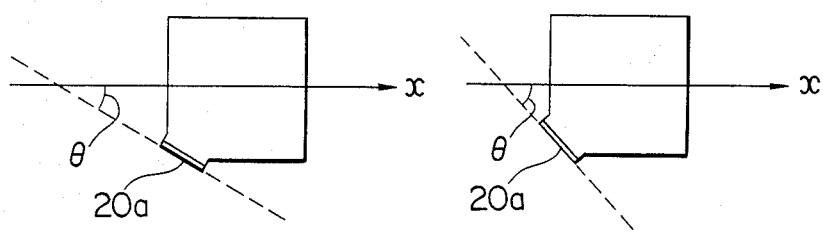

The size of each of said mirror picture element plates 19 is of such a degree that the diffraction of the incident light beam cannot be neglected, from the limitation in the arrangement thereof, and since the shape of each picture element is quadrilateral, this diffraction pattern widens in the form of a cross in the directions of the respective sides of the quadrilateral, as shown in FIG. 6. By bringing down each mirror picture element plate 19 obliquely with the hinge 20 at a corner of the quadrilateral of the picture element plate 19 as the axis of rotation, as previously described, it becomes possible to set the signal light so as not to overlap the cross of the diffraction pattern 21 of the unnecessary light. Bringing down the mirror picture element plate obliquely will now be described in detail. FIGS. 7A–7D show the cases where the hinge portion 20 is attached to various portions of the mirror picture element plate 19. In FIGS. 7A–7D, reference character 20a designates the axis of rotation of the hinge portion 20, and the x-axis is the coordinates axis plotted in the same direction as the main scan direction. If the axis of rotation is provided as shown in FIGS. 7A and 7B (the case of the prior art), it will be difficult for the diffraction pattern of the necessary signal light to be separated from the cross of the diffraction pattern of the unnecessary light, but if the axis of rotation is provided as shown in FIGS. 7C and 7D, such separation will become easy as previously described. That is, if the angle $\theta$ formed between the axis of rotation and the x-axis is any other angle than 0 or $\pi/2$, the aforementioned effect will occur more or less, and it can be expected that the effect will be greatest particularly when the angle $\theta$ is $\pi/4$. Consequently, if the axis of rotation 20a is set so that $\theta = \pi/4$, the separation of the two reflected lights will become best and the diffracted light 21 as the noise entering the entrance pupil 23 can be extremely reduced.

Now, in the optical path leading from the light source 11 via the condenser lens 12 to the entrance pupil of the projection lens 14 deflected and reflected by the light modulator 13, the Keller illumination method is basically adopted in the present invention. That is, an optical system for forming the image of the light source 11 on the entrance pupil of the projection lens 14 in FIG. 3A is adopted. However, the entrance pupil of the projection lens 14 is disposed at a position deviating in the direction of deflection and reflection in the signal ON state.

Also, the projection lens 14 as previously described is usually an enlarging projection system since the picture elements 19 on the modulator 13 are minute, and to keep the length of the optical path of this system short, that is, to keep the device compact, it is desirable to set the focal length of the projection lens 14 shortly.

In such a case, the diameter of the entrance pupil of the projection lens 14 is small as a matter of course, and in the Keller illumination method, it is possible to form the image of the light source 11 having a versatile filament area on the entrance pupil of the projection lens 14 through the condenser lens 12 substantially without enlarging said image, and even the small entrance pupil poses no problem.

For example, where the focal length $f_o$ of the projection lens 14 is set to $f_o = 25$ mm and the F-number $F_o$ of the projection lens 14 is set to $F_o = 5.6$, the diameter $\phi_o$ of the entrance pupil thereof is $\phi_o = 4.5$ mm, and an ordinary tungsten lamp having a filament diameter $\phi_f$ of the order of 4.5 mm can be readily obtained and as a result, the light source magnification in the illuminating optical system is $$m_f = \phi_o / \phi_f \approx 1.0,$$

which is a realizable value. On the other hand, the length L of the optical path leading from the light source 11 of the illuminating optical system to the entrance pupil of the projection lens 14 can be expressed as $$L = (m_f + 1/m_f + 2) \times f_c + \overline{HH'}_c,$$

where $f_c$ is the focal length of the condenser lens 12 and $HH'_c$ is the spacing between the principal surfaces of the condenser lens 12. It can be seen from the foregoing equation that if $f_c$ and $HH'_c$ are constant, $m_f = 1.0$ and L assumes a minimum value. Accordingly, the optical path of the illuminating system can be made compact.

The present invention is not restricted to the above-described embodiment, but various modifications thereof are possible.

For example, the shape of the picture element on the light modulator is not limited to a quadrilateral, but may be a lozenge, a triangle or an ellipse to obtain the same effect.

As another important thing, to reduce the diffracted light entering as noise, the expanse of the diffracted light pattern 21 may be made small, but the expanse of this diffracted light pattern 21 is in a deep relation with the shape of the condenser lens 12.

The illuminating condenser lens 12 can be made very flat because, as shown in FIG. 4A, the arrangement of the picture element plates 19 on the modulator 13 is vertically in two rows and therefore it suffices to apply a laterally elongated slit light beam. On the contrary, if the condenser lens 12 is made not flat but too thick, the light beam entering the light modulator 13 includes much of the light beam perpendicular to the main scan direction and the expanse and intensity of the unnecessary diffraction pattern are made great and as a result, it becomes difficult to take out only the necessary light modulation signal even if the angle $\theta$ is optimally selected as described above. Consequently, it is preferable to make the condenser lens 12 flat.

Also, making the condenser lens 12 flat leads to a great advantage that the optical system is made compact in the direction of height.

Further, by the condenser lens 12 and the projection lens 14 used in the present invention being made flat as shown in FIGS. 3A and 3B, the optical system can be made compact in the direction of height. Particularly, making the projection lens 14 flat causes the aperture ratios of the projection lens 14 in the main scan direction and the sub scan direction to differ from each other relative to the light modulator 13 as a secondary light source, and the shape of each dot imaged on the photosensitive drum 16 through the projection lens 14 becomes longer in the sub scan direction than in the main scan direction, and this is preferable in the quality of printing or image depiction.

Further, disposing the projection lens 14 in a flat form parallel to the lateral direction of the light modulator array elements leads to the possibility of separating and eliminating the noise-providing unnecessary diffracted light component while keeping the distance between the projection lens and the light modulator array elements short even in a case where the difference in the angle of reflection and deflection of the light modulator array between the ON state and the OFF state can only assume a small angle, and this also leads to an advantage that the optical system can be made compact in the lateral direction.

According to the present invention as described above, in the optical system for illuminating the electro-mechanical light modulator array elements, it becomes possible to form the image of the light source such as a versatile tungsten lamp on the entrance pupil of the projection lens at a magnification in the vicinity of one-to-one magnification by the use of the Keller illumination method, thereby uniformly illuminating said modulator array elements which are the object to be illuminated and making the optical path of the illuminating system compact.

I claim:

1. A light scanning optical system of an image output scanner, comprising:
   a light source;
   an irradiating optical system;
   an electro-mechanical light modulator, said modulator including an array of elements arranged in a main scan direction and each capable of deflecting an incident light beam from said light source through said irradiating optical system in at least two directions in accordance with an input signal, each of said elements making image information by a change-over of a direction of deflection of each of said elements in accordance with the input signal; and
   a projection optical system for projecting only a signal input of the image information which is deflected in at least one direction of said at least two directions, the image of said light source being set so as to be formed on an entrance pupil of said projection optical system at a magnification in the vicinity of one-to-one magnification.

2. A light scanning optical system according to claim 1, wherein each of said elements of said modulator rotates about an axis of rotation to deflect the incident light beam.

3. A light scanning optical system according to claim 2, wherein the angle formed between the axis of rotation of each of said elements of said modulator and the main scan direction of said array of elements is an angle other than 0 and π/2.

4. A light scanning optical system according to claim 1, wherein the shape of said projection optical system is flat in the main scan direction.

5. A light scanning optical system according to claim 1, wherein the shape of said irradiating optical system is flat in the main scan direction.

6. An optical system of an image output apparatus, comprising:
an irradiating optical system;
a light modulator, said modulator including an array of elements arranged in a predetermined direction, each of said elements being capable of directing an incident light beam from a light source through said irradiating optical system in at least two directions in accordance with an input signal, and each of said elements making image information in accordance with an input signal; and
a projection optical system for projecting the input signal only if the input signal conveys image information which is directed in at least one of said at least two directions, the image of said light source being set so as to be formed on an entrance pupil of said projection optical system.

7. An optical system according to claim 6, wherein each of said elements has a minute reflecting surface for reflecting the light beam incident on said light modulator.

8. An optical system according to claim 7, wherein said reflecting surface of each of said elements rotates about a preetermined axis of rotation in accordance with the input signal.

9. An optical system according to claim 8, wherein the angle formed between said axis of rotation of each of said elements and the directon of said array of elements is an angle other than 0 and other than π/2.

10. An optical system according to claim 6, wherein the image of said light source is set so as to be formed on the entrance pupil of said projection optical system at a magnification in the vicinity of one-to-one magnification.

11. An optical system according to claim 6, wherein the signal input of the image information forms a row of dots on a photosensitive member, through said projection optical systam.

12. An optical system according to claim 11, wherein said optical system of the image output apparatus constitutes a scanning optical system and the direction of said array of elements is a main scan direction of said scanning optical system.

13. An optical system according to claim 12, wherein said photosensitive member is a photosensitive drum.

14. An optical system according to claim 6, wherein said projection optical system includes a lens system the shape of which is flat in the direction of said array of elements.

15. An optical system according to claim 6, wherein said irradiating optical system includes a lens system the shape of which is flat in the direction of said array of elements.

16. An optical system for projecting image information on a light receiving surface in accordance with an input signal, said optical system comprising:
a light source;
an irradiating optical system;
light modulating means, said modulating means including an array of modulating elements arranged in a predetermined direction, each of said elements being capable of directing an incident light beam from said light source through said irradiating optical system in first and second directions, which are different from each other, in accordance with the input signal, and each of said elements making image information in accordance with the input signal and the light beam directed in said first direction being the signal input of the image information; and
a projection optical system for projecting the image information onto the light receiving surface, the image of said light source being set so as to be formed on an entrance pupil of said projection optical system, through said modulating means and said projection optical system.

17. An optical system according to claim 16, wherein the image of said light source is formed on said entrance pupil at a magnification in the vicinity of one-to-one magnification.

18. An optical system according to claim 16, wherein each of said elements has a minute reflecting surface rotatable about a predetermined axis of rotation.

19. An optical system according to claim 18, wherein the angle formed between said axis of rotation of each of said elements and the direction of said array of elements is an angle other than 0 and other than π/2.

20. An optical system according to claim 16, wherein said modulating means is irradiated with a slit-like light beam by said irradiating optical system.

21. An optical system according to claim 20, wherein said irradiating optical system includes a lens system the shape of which is flat in the direction of said array of elements.

22. An optical system according to claim 20, wherein said projection optical system includes a lens system the shape of which is flat in the direction of said array of elements.

* * * * *

UNITED STATES PATENT AND TRADEMARK OFFICE
CERTIFICATE OF CORRECTION

PATENT NO. : 4,755,013
DATED : July 5, 1988
INVENTOR(S) : MICHITAKA SETANI

It is certified that error appears in the above-identified patent and that said Letters Patent is hereby corrected as shown below:

COLUMN 5

Line 38, "$HH'_c$" should read --$\overline{HH}'_c$--.
    Line 40, "$HH'_c$" should read --$\overline{HH}'_c$--.

COLUMN 7

Line 32, "preetermined" should read --predetermined--.
    Line 36, "directon" should read --direction--.

Signed and Sealed this

Twenty-fourth Day of January, 1989

Attest:

DONALD J. QUIGG

*Attesting Officer*    *Commissioner of Patents and Trademarks*